US012740599B2

(12) United States Patent
Füglistaller et al.

(10) Patent No.: US 12,740,599 B2
(45) **Date of Patent: *Sep. 22, 2026**

(54) AEROSOL GENERATION DEVICE POWER SYSTEM

(71) Applicant: JT International SA, Geneva (CH)

(72) Inventors: Jörg Füglistaller, Widen (CH); Grzegorz Aleksander Pilatowicz, Grens (CH)

(73) Assignee: JT International SA, Geneva (CH)

( * ) Notice: Subject to any disclaimer, the term of this patent is extended or adjusted under 35 U.S.C. 154(b) by 577 days.

This patent is subject to a terminal disclaimer.

(21) Appl. No.: 18/033,653

(22) PCT Filed: Oct. 25, 2021

(86) PCT No.: PCT/EP2021/079570

§ 371 (c)(1),
(2) Date: Apr. 25, 2023

(87) PCT Pub. No.: WO2022/090170

PCT Pub. Date: May 5, 2022

(65) Prior Publication Data

US 2023/0301367 A1 Sep. 28, 2023

(30) Foreign Application Priority Data

Oct. 26, 2020 (EP) .................................... 20203968

(51) Int. Cl.
*A24F 40/57* (2020.01)
*A24F 40/90* (2020.01)
(Continued)

(52) U.S. Cl.
CPC .............. *A24F 40/57* (2020.01); *A24F 40/90* (2020.01); *H02J 7/345* (2013.01); *H02J 7/865* (2026.01)

(58) Field of Classification Search
None
See application file for complete search history.

(56) References Cited

U.S. PATENT DOCUMENTS 4,947,874 A 8/1990 Brooks et al.
5,095,921 A 3/1992 Losee et al.
(Continued)

FOREIGN PATENT DOCUMENTS

CA 2380945 A1 10/2003
CN 101969800 A 2/2011
(Continued)

OTHER PUBLICATIONS

Chen et al.; WO 2017012105 A1; published Jan. 26, 2017; English machine translation included; 25 pages. (Year: 2017).*
(Continued)

*Primary Examiner* — Linda L Gray
(74) *Attorney, Agent, or Firm* — Lerner David LLP

(57) ABSTRACT

An aerosol generation device includes a power system and a controller. The power system includes a first energy storage module and a second energy storage module. The controller is configured to control a pulse width modulated power flow of the power system to a heater associated with the aerosol generation device. The pulse width modulated power flow includes one or more pulse width modulation cycles each having an on period and an off period. The controller is further configured to control the second energy storage module to charge the first energy storage module during the pulse width modulation cycle off period.

15 Claims, 7 Drawing Sheets

(51) Int. Cl.
*H02J 7/00* (2006.01)
*H02J 7/34* (2006.01)

(56) References Cited

U.S. PATENT DOCUMENTS

| | | | |
|---|---|---|---|
| 5,808,447 | A | 9/1998 | Hagino |
| 2009/0230117 | A1 | 9/2009 | Fernando et al. |
| 2014/0278250 | A1 | 9/2014 | Smith et al. |
| 2015/0333552 | A1 | 11/2015 | Alarcon |
| 2016/0360787 | A1 | 12/2016 | Bailey |
| 2017/0112191 | A1 | 4/2017 | Sur et al. |
| 2017/0258135 | A1 | 9/2017 | Yerkic-Husejnovic et al. |
| 2017/0294804 | A1 | 10/2017 | Sur |
| 2017/0347714 | A1 | 12/2017 | Metz et al. |
| 2018/0140008 | A1 | 5/2018 | Sur et al. |
| 2018/0140011 | A1 | 5/2018 | Sur et al. |
| 2018/0140013 | A1 | 5/2018 | Sur et al. |
| 2020/0037664 | A1 | 2/2020 | Fursa et al. |
| 2020/0128884 | A1 | 4/2020 | Yamada et al. |
| 2020/0154779 | A1 | 5/2020 | Novak, III et al. |
| 2020/0154787 | A1* | 5/2020 | Novak, III .............. A24F 40/57 |
| 2020/0329776 | A1 | 10/2020 | Lee |
| 2023/0301367 | A1 | 9/2023 | Füglistaller et al. |
| 2023/0397671 | A1 | 12/2023 | Pilatowicz |

FOREIGN PATENT DOCUMENTS

| | | | |
|---|---|---|---|
| CN | 204540813 | U | 8/2015 |
| CN | 204763429 | U | 11/2015 |
| CN | 108290016 | A | 7/2018 |
| CN | 109314397 | A | 2/2019 |
| CN | 109890233 | A | 6/2019 |
| CN | 209846175 | U | 12/2019 |
| CN | 111542240 | A | 8/2020 |
| CN | 116349107 | A | 6/2023 |
| CN | 116546896 | A | 8/2023 |
| EP | 2100525 | A1 | 9/2009 |
| EP | 3007305 | A1 | 4/2016 |
| EP | 3607985 | A1 | 2/2020 |
| JP | H02124082 | A | 5/1990 |
| JP | H06315366 | A | 11/1994 |
| JP | 2011515080 | A | 5/2011 |
| JP | 2019524069 | A | 9/2019 |
| JP | 2019537450 | A | 12/2019 |
| JP | 2020500024 | A | 1/2020 |
| JP | 2020068706 | A | 5/2020 |
| WO | 2009112182 | A1 | 9/2009 |
| WO | 2017/070039 | A1 | 4/2017 |
| WO | 2017108429 | A1 | 6/2017 |
| WO | 2018001910 | A1 | 1/2018 |

OTHER PUBLICATIONS

Search Report dated May 29, 2025 from the Office Action for Chinese Application No. 202180072616.8 issued May 31, 2025, pp. 1-3.

International Search Report for PCT/EP2021/079570 mailed Feb. 8, 2022. 5 pgs.

International Search Report for PCT/EP2021/079572 mailed Feb. 23, 2022. 5 pgs.

International Search Report for PCT/EP2021/079571 mailed Feb. 7, 2022. 3 pgs.

Pilatowicz, G., "Aerosol Generation Device Power System", Co-pending U.S. Appl. No. 18/033,486, filed Apr. 24, 2023.

Fuglistaller, J., "Aerosol Generation Device Power System", Co-pending U.S. Appl. No. 18/033,678, filed Apr. 25, 2023.

Jingli, X. et al., "Physical Chemistry Experiments" Published by: Shanghai Jiao Tong University Press, Shanghai Jiao Tong University Press, Oct. 2009, pp. 1-3.

Kai, W. et al.,"Supercapacitors and Their Applications in Energy Storage Systems" Published by: Mechanical Industry Press, Printed by Sanhe Guoying Printing Co., Ltd. 1st Edition, 1st Printing, Mar. 2020, Standard Book No. ISBN 978-7-111-64394-4, 3 pages.

* cited by examiner 600
608
624
604
U2
630
622
606
U1
632
634'
634'
634

AEROSOL GENERATION DEVICE POWER SYSTEM

CROSS-REFERENCE TO RELATED APPLICATIONS

The present application is a national phase entry under 35 U.S.C. § 371 of International Application No. PCT/EP2021/079570, filed Oct. 25, 2021, published in English, which claims priority to European Application No. 20203968.1 filed Oct. 26, 2020, the disclosures of which are incorporated herein by reference in their entireties.

FIELD OF INVENTION

The present invention relates to aerosol generation devices, and more specifically aerosol generation device power systems.

BACKGROUND

Aerosol generation devices such as electronic cigarettes and other aerosol inhalers or vaporisation devices are becoming increasingly popular consumer products.

Heating devices for vaporisation or aerosolisation are known in the art. Such devices typically include a heating chamber and heater. In operation, an operator inserts the product to be aerosolised or vaporised into the heating chamber. The product is then heated with an electronic heater to vaporise the constituents of the product for the operator to inhale. In some examples, the product is a tobacco product similar to a traditional cigarette. Such devices are sometimes referred to as "heat not burn" devices in that the product is heated to the point of aerosolisation, without being combusted.

Problems faced by known aerosol generation devices include providing sufficiently fast heating and the effective use of energy.

SUMMARY OF INVENTION

According to a first aspect, there is provided an aerosol generation device comprising:

- a power system comprising a first energy storage module and a second energy storage module; and
- a controller, wherein the controller is configured to:
- control a pulse width modulated power flow of the power system to a heater associated with the aerosol generation device, wherein the pulse width modulated power flow comprises one or more pulse width modulation cycles each having an on period and an off period; and
- control the second energy storage module to charge the first energy storage module during the pulse width modulation cycle off period.

In this way, while the first energy storage module powers the heater, the first energy storage module is also continuously recharged by the second energy storage module. This allows the first energy storage module to power the heater for a greater time before its charge level is depleted. As the first energy storage module is recharged whilst powering the heater, it does not need to be able to store as great an amount of charge as an energy storage module in a traditional power system that is not recharged whilst powering the heater. This allows the first energy storage module to be physically smaller, with associated safety improvements.

In a preferable first implementation of the first aspect, the first energy storage module is a supercapacitor module and the second energy storage module is a battery module.

A supercapacitor module can be considered high power storage module, and a battery can be considered a high energy storage module. In this arrangement, the power system does not rely only on a battery, and there is therefore no compromise between energy and power requirements. Using a high energy battery in combination with a high power supercapacitor allows for the energy and power requirements to be separately considered in the power system design, thereby providing greater flexibility to meet the energy and power requirements.

The continuous recharging of the supercapacitor module during the aerosolisation session, in the pulse width modulation cycle off periods, allows for the use of supercapacitors with a smaller energy content (i.e. smaller supercapacitors). This allows for reductions in size and cost.

Preferably, the supercapacitor module comprises at least one supercapacitor. Preferably, the supercapacitor module comprises a plurality of supercapacitors connected in series. Preferably, the supercapacitor module comprises two supercapacitors connected in series. Preferably, the battery module comprises at least one battery. Preferably, the battery module comprises a high energy battery. Preferably, the battery module comprises a lithium ion battery.

Preferably, the controller is further configured to:

- control the power system to provide the pulse width modulated power flow from only the supercapacitor module to the heater during the pulse width modulation cycle on period.

Powering the heater only with the supercapacitor module leads to reduced losses during operation. For example, a step-up converter (such as a DC/DC voltage converter) is not required between the supercapacitor module and the heater. In this way, the aerosol generation device can provide the same energy usage as a traditional system, but with a smaller total energy content stored in the power system due to the improvement to the losses.

As the battery module is used only to charge the supercapacitor module, and not power the heater, losses are reduced from the battery. This allows the operator to perform multiple aerosolisation session from a single battery charge as less power is wasted.

Preferably, the controller is configured to:

- control the battery module to not charge the supercapacitor module during the pulse width modulation cycle on period.

Preferably, the power system comprises the supercapacitor module connected in parallel with the battery module, with a voltage converter connected between the supercapacitor module and the battery module.

Preferably, the power system comprises the supercapacitor module connected in parallel with the battery module, with a voltage converter connected between the supercapacitor module and the battery module.

Preferably, the power system further comprises:

- a first switching means connected between the battery module and the supercapacitor module, wherein the first switching means is controlled by the controller to control the battery module to charge the supercapacitor module during the off period of the pulse width modulation cycle; and
- a second switching means configured to be arranged between the supercapacitor module and the heater, wherein the second switching means is controlled by the controller to control the pulse width modulated power flow from the supercapacitor module to the heater.

This arrangement of the power system allows for the battery module to be decoupled from the supercapacitor module through the power management. A battery can have a higher associated safety risk and lower longevity, whereas a supercapacitor can have a lower safety risk and higher robustness and reliability. Preferably, only the supercapacitor module powers the heater, and the battery module is only used to recharge the supercapacitor module, with the battery module not directly transferring energy to the heater; this increases the overall safety and reliability of the power system. By not directly powering the heater, lower maximum current requirements are needed for the battery, which can reduce the stress applied to the battery and improve its longevity and reliability.

Preferably, the switching means are transistors controlled by the controller. In this way, the switching means can be effectively used to bring about control of the power flow in the power system.

In a preferable second implementation of the first aspect, the first energy storage module is a first supercapacitor module and the second energy storage module is a second supercapacitor module.

In this way, by powering the aerosol generation device with only supercapacitor based technology, a battery is not required in the aerosol generation device. This means that, in use in an aerosolisation session, a battery is not positioned near to the mouth of the operator. This improves the safety of the aerosol generation device.

Preferably, the pulse width modulated power flow to the heater comprises only a power flow from the first supercapacitor module and not a power flow from the second supercapacitor module.

Preferably, the power system further comprises: a first switching means connected between the first supercapacitor module and the second supercapacitor module, wherein the first switching means is controlled by the controller to control the second supercapacitor module to charge the first supercapacitor module during the off period of the pulse width modulation cycle; and/or a second switching means configured to be arranged between the first supercapacitor module and the heater, wherein the second switching means is controlled by the controller to control the pulse width modulated power flow from the first supercapacitor module to the heater.

Preferably, the first supercapacitor module comprises at least one supercapacitor, or two or more supercapacitors connected series. Preferably, the supercapacitor(s) of the first supercapacitor module are traditional supercapacitors. Preferably, the first supercapacitor module comprises two 2.5 V supercapacitor connected in series, giving the first supercapacitor module an overall 5 V.

Preferably, the second supercapacitor module comprises at least one hybrid capacitor (also known as a hybrid supercapacitor). A hybrid capacitor can have a higher operating voltage, higher capacitance and higher energy density than a traditional supercapacitor. A hybrid capacitor can have a lower power capability than a traditional supercapacitor. Preferably, the second supercapacitor module comprises a 3.7 V hybrid capacitor, giving the second supercapacitor module an overall 3.7 V.

In a preferable third implementation of the first aspect, the first energy storage module is a supercapacitor module and the second energy storage module is a battery module; and in the on period, the controller controls the battery module and the supercapacitor module to power the heater; and in the off period, the controller controls the battery module to charge the supercapacitor module.

A supercapacitor module can be considered high power energy storage module, and a battery can be considered a high energy storage module. In this arrangement, the power system does not rely only on a battery, and there is therefore no compromise between energy and power requirements. Using a high energy battery in combination with a high power supercapacitor allows for the energy and power requirements to be separately considered in the power system design, thereby providing greater flexibility to meet the energy and power requirements.

In another advantage, an increased overall system safety is provided due to a reduction in the maximal current flowing through the power system, in comparison to a standard battery-based power system.

The continuous recharging of the supercapacitor module during the aerosolisation session, in the pulse width modulation cycle off periods, allows for the use of supercapacitors with a smaller energy content (i.e. smaller supercapacitors). This allows for reductions in size and cost. As the capacity of the supercapacitor module is much lower than that of the battery module, the supercapacitor module can be charged very quickly meaning that the discharge current of the battery module is high only for a short period of time.

Preferably, the supercapacitor module comprises at least one supercapacitor. Preferably, the supercapacitor module comprises a plurality of supercapacitors connected in series. Preferably, the supercapacitor module comprises two supercapacitors connected in series. Preferably, the battery module comprises at least one battery. Preferably, the battery module comprises a high energy battery. Preferably, the battery module comprises a lithium ion battery.

Preferably, the power system further comprises a switching means configured to switch the power system between a second configuration in the on period and a first configuration in the off period, wherein in the second configuration the supercapacitor module and battery module are connected in series, and first configuration the supercapacitor module and the battery module are connected in parallel.

Advantageously, the recharging of the supercapacitor module does not need to be controlled when the supercapacitor module and the battery module are in the first configuration. The high charge acceptance of the supercapacitor module allows the recharging to happen naturally, and without the need for a voltage converter. This reduces losses in the power system.

This arrangement allows for high power delivery to the heater (and in particular a high resistance, >1Ω, heater or alternative heating technology such as an induction heater) without needing a step-up voltage converter. In this way, the losses that would otherwise be introduced to the power system through such a converter are obviated.

Preferably, the switching means are transistors controlled by the controller. In this way, the switching means can be effectively used to bring about control of the power flow in the power system.

Preferably, the power system is configured to apply a summed potential of the battery module and the supercapacitor module to the heater in the on period.

The summed potential of the battery module and the supercapacitor module provides a higher voltage compared to a standard single cell power system. This allows the same power to be delivered with a lower current. In this way, losses are significantly reduced in the system as $P_{LOSS}=I^2R_{SYSTEM}$. Additionally, a higher degree of flexibility in the type of battery used is achieved, compared to standard power systems for aerosol generation devices, as a lower maximum current is required.

Preferably, the power system of each of the preceding implementations is operable in a plurality of selectable operating modes of an aerosolisation session, the plurality of operating modes comprising a float mode, wherein the controller is configured to:

control the power system to apply the pulse width modulated power flow to the heater with a first duty cycle regime to maintain the heater substantially at an aerosol generation temperature.

In this way, power can be applied to the heater to generate an aerosol from the aerosol generating consumable, which can be controlled using pulse width modulation, whilst also recharging the first energy storage module during the pulse width modulation cycle off periods, thereby improving the length of time for which the first energy storage module is able to power the heater.

Preferably, the plurality of operating modes further comprises a pre-heating mode, wherein the controller is configured to:

control the power system to apply the pulse width modulated power flow to the heater with a second duty cycle regime, different to the first duty cycle regime, during a pre-heating mode before the float mode to heat the heater to the aerosol generation temperature.

Preferably, the first duty cycle regime comprises one or more pulse width modulation cycles with a first duty cycle ratio D1, the second duty cycle regime comprises one or more pulse width modulation cycles with a second duty cycle ratio D2, wherein $D2=D1\times K$, where K is a coefficient that is $\gg 1$.

In this way, the heater can be rapidly heated to the aerosol generation temperature during the pre-heating mode, and then maintained at the aerosol generation temperature with a lower power consumption for the float mode.

In an example, D1 is much less than 1 and D2 is near to but less than 1. In another example, D1 is $\ll 0.5$ and D2 is $\geq 0.5$. In another example, the first duty cycle is configured such that $<3$ W is applied in the float mode, and the second duty cycle is configured such that approximately 16 W is applied in the preheating mode.

Preferably, the plurality of operating modes comprises a post-float mode, wherein the controller is configured to:

disable the pulse width modulated power flow to the heater following the float mode for a remaining time period in the aerosolisation session; and control the second energy storage module to charge the first energy storage module.

In this way, after the pulse width modulated power flow has been disabled, the residual heat held in the heater can continue to aerosolise the aerosol generating consumable without power directly being applied to the heater. At the same time, the second energy storage module can at least partially recharge the first energy storage module for a subsequent aerosolisation session during the remainder of the present aerosolisation session. That is, the first energy storage module will be charged to execute a subsequent pre-heating mode.

Preferably, the second energy storage module can be controlled to continue to recharge the first energy storage module beyond the end of the aerosolisation session, until the first energy storage module is sufficiently charged for the subsequent aerosolisation session.

In a second aspect, there is provided a method of controlling a power system of an aerosol generation device, the power system comprising a first energy storage module and a second energy module, and the method comprising:

controlling a pulse width modulated power flow of the power system to a heater associated with the aerosol generation device, wherein the pulse width modulated power flow comprises one or more pulse width modulation cycles each having an on period and an off period; and controlling the second energy storage module to charge the first energy storage module during the pulse width modulation cycle off period.

Optionally, the second aspect can comprise the preferable features of the first aspect.

In a third aspect, there is provided a non-transitory computer-readable medium storing instructions that when executed by one or more processors of a controller configured for operation with an aerosol generation device power system comprising a first energy storage module and a second energy storage module, cause the one or more processors to control the power system by:

controlling a pulse width modulated power flow of the power system to a heater associated with the aerosol generation device, wherein the pulse width modulated power flow comprises one or more pulse width modulation cycles each having an on period and an off period; and controlling the second energy storage module to charge the first energy storage module during the pulse width modulation cycle off period.

Optionally, the third aspect can comprise the preferable features of the first aspect.

In a fourth aspect, there is provided an aerosol generation device comprising:

a power system comprising a first supercapacitor module and a second supercapacitor module; and a controller, wherein the controller is configured to:

control a power flow of the first supercapacitor module to power a heater associated with the aerosol generation device; and control a power flow of the second supercapacitor module to charge the first supercapacitor module.

In this way, by powering the aerosol generation device with only supercapacitor based technology, a battery is not required in the aerosol generation device. This means that, in use in an aerosolisation session, a battery is not positioned near to the mouth of the operator. This improves the safety of the aerosol generation device.

Preferably, the aerosol generation device comprises an electrical connection for a charging component comprising a battery module, and the power system does not comprise a battery.

In this way, the second supercapacitor module can be recharged for further aerosolisation sessions. Preferably, the charging component is an external charging module. Preferably, this can be a power bank or external charger.

Preferably, the first supercapacitor module comprises at least one supercapacitor; and/or the second supercapacitor module comprises at least one hybrid capacitor.

Preferably, the first supercapacitor module comprises two or more supercapacitors connected series. Preferably, the supercapacitor(s) of the first supercapacitor module are traditional supercapacitors. Preferably, the first supercapacitor module comprises two 2.5 V supercapacitor connected in series, giving the first supercapacitor module an overall 5 V.

A hybrid capacitor (also known as a hybrid supercapacitor) can have a higher operating voltage, higher capacitance and higher energy density than a traditional supercapacitor. A hybrid capacitor can have a lower power capability than a traditional supercapacitor. Preferably, the second supercapacitor module comprises a 3.7 V hybrid capacitor, giving the second supercapacitor module an overall 3.7 V.

In this way, the higher capacitance and higher energy density of the hybrid capacitor based second supercapacitor module can be utilised to charge the first supercapacitor module, and the higher power capability of the traditional supercapacitor based first supercapacitor module can be utilised to power the heater.

Preferably, the first supercapacitor module and second supercapacitor module are connected in parallel, and the power system further comprises:

a first switching means connected between the first supercapacitor module and the second supercapacitor module, wherein the first switching means is controlled by the controller to control the second supercapacitor module to charge the first supercapacitor module; and/or a second switching means configured to be arranged between the first supercapacitor module and the heater, wherein the second switching means is controlled by the controller to control a power flow from the first supercapacitor module to the heater.

Preferably, the switching means are transistors controlled by the controller. In this way, the switching means can be effectively used to bring about control of the power flow in the power system.

Preferably, the power flow of the first supercapacitor module is a pulse width modulated power flow comprising one or more pulse width modulation cycles each having an on period and an off period; and the controller is further configured to:

control the power flow of the second supercapacitor module to charge the first supercapacitor module during the pulse width modulation cycle off period.

In this way, while the first supercapacitor module powers the heater, the first supercapacitor module is also continuously recharged by the second supercapacitor module. This allows the first supercapacitor module to power the heater for a greater time before its charge level is depleted. As the first supercapacitor module is recharged whilst powering the heater, it does not need to be able to store as great an amount of charge as an energy storage module in a traditional power system that is not recharged whilst powering the heater. This allows the first supercapacitor module to be physically smaller, with associated safety improvements.

Preferably, the power system is operable in a float mode, wherein in the float mode the controller is configured to:

control the first supercapacitor module to apply the pulse width modulated power flow to the heater with a first duty cycle regime to maintain the heater substantially at an aerosol generation temperature.

In this way, power can be applied to the heater to generate an aerosol from the aerosol generating consumable, which can be controlled using pulse width modulation, whilst also recharging the first supercapacitor module during the pulse width modulation cycle off periods, thereby improving the length of time for which the first supercapacitor module is able to power the heater.

Preferably, the power system is operable in a pre-heating mode, wherein in the pre-heating mode the controller is configured to:

control the first supercapacitor module to apply the pulse width modulated power flow to the heater with a second duty cycle regime, different to the first duty cycle regime, during the pre-heating mode before the float mode to heat the heater to the aerosol generation temperature.

Preferably, the first duty cycle regime comprises one or more pulse width modulation cycles with a first duty cycle ratio D1, the second duty cycle regime comprises one or more pulse width modulation cycles with a second duty cycle ratio D2; wherein $D2=D1\times K$, where K is a coefficient that is $>>1$.

In this way, the heater can be rapidly heated to the aerosol generation temperature during the pre-heating mode, and then maintained at the aerosol generation temperature with a lower power consumption for the float mode.

In an example, D1 is much less than 1 and D2 is near to but less than 1. In another example, D1 is $<<0.5$ and D2 is $\geq 0.5$. In another example, the first duty cycle is configured such that $<3$ W is applied in the float mode, and the second duty cycle is configured such that approximately 16 W is applied in the preheating mode.

Preferably, the power system is operable in a post-float mode, wherein in the post-float mode the controller is configured to:

disable the power flow to the heater following the float mode for a remaining time period in the aerosolisation session; and control the second energy storage module to charge the first energy storage module.

In this way, after the pulse width modulated power flow has been disabled, the residual heat held in the heater can continue to aerosolise the aerosol generating consumable without power directly being applied to the heater. At the same time, the second supercapacitor module can at least partially recharge the first supercapacitor module for a subsequent aerosolisation session during the remainder of the present aerosolisation session. That is, the first supercapacitor module will be charged to execute a subsequent pre-heating mode.

Preferably, the second supercapacitor module can be controlled to continue to recharge the first supercapacitor module beyond the end of the aerosolisation session, until the first supercapacitor module is sufficiently charged for the subsequent aerosolisation session.

In a fifth aspect, there is provided an aerosol generation device charging component connectable to the aerosol generation device of the fourth aspect, wherein the aerosol generation device charging component is configured to charge the second supercapacitor module when connected to the aerosol generation device.

In this way, the operator of the aerosol generation device can execute multiple aerosolisation sessions before connecting the aerosol generation device to the external charging component (such as a power bank or docking station or mains power source). This allows for a reduced size aerosol generation device, that is more comfortable to handle, with improved safety in that there is no battery in the aerosol generation device itself.

Preferably, the aerosol generation device charging component comprises a battery module configured to provide charge to the power system of the aerosol generation device.

In this way, the charging component can be a portable charging component that does not require an external power source, such as a mains power source, in order to charge the second supercapacitor module.

Preferably, the aerosol generation device charging component is a charging case configured to accommodate the aerosolisation generation device.

Alternatively, the aerosol generation device charging component is a docking station and/or a power bank.

In a sixth aspect, there is provided a system comprising the aerosol generation device of the fourth aspect, and the aerosol generation device charging component of the fifth aspect.

In a seventh aspect, there is provided a method of controlling a power system of an aerosol generation device, the power system comprising a first supercapacitor module and a second supercapacitor module, and the method comprising:

controlling a power flow of the first supercapacitor module to power a heater associated with the aerosol generation device; and controlling a power flow of the second supercapacitor module to charge the first supercapacitor module.

Optionally, the seventh aspect can comprise the preferable features of the fourth aspect.

In an eighth aspect, there is provided a non-transitory computer-readable medium storing instructions that when executed by one or more processors of a controller configured for operation with an aerosol generation device power system comprising a first supercapacitor module and a second supercapacitor module, cause the one or more processors to control the power system by:

controlling a power flow of the first supercapacitor module to power a heater associated with the aerosol generation device; and controlling a power flow of the second supercapacitor module to charge the first supercapacitor module.

Optionally, the eighth aspect can comprise the preferable features of the fourth aspect.

BRIEF DESCRIPTION OF THE DRAWINGS

Embodiments of the invention are now described, by way of example, with reference to the drawings, in which.

DETAILED DESCRIPTION

Figure 1:
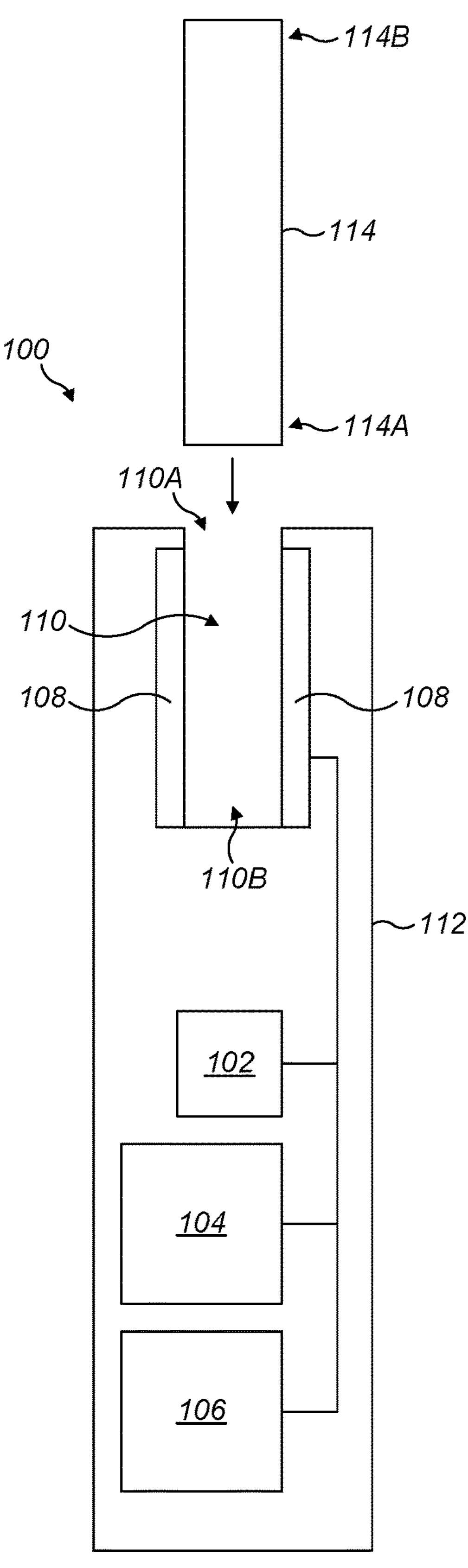
FIG. 1 is a block diagram of an aerosol generation device.

FIG. 1 shows a block diagram of the components of an aerosol generation device 100 or a vapor generation device, also known as an electronic cigarette. For the purposes of the present description, it will be understood that the terms vapor and aerosol are interchangeable.

The aerosol generation device 100 has a body portion 112 containing controller 102, and a power system comprising a first energy storage module 104 and a second energy storage module 106. The power system is operable in a plurality of selectable operating modes. Herein only one first energy storage module 104 and one second energy storage module 106 are referred to; the skilled person will however understand that the power system can comprise one or more first energy storage modules and one or more second energy storage modules as appropriate. The controller 102 is configured to control a power flow of the first energy storage module 104 and the second energy storage module 106 based on the selected operating mode, as will be subsequently described. The controller 102 can be at least one microcontroller unit comprising memory, with instructions stored thereon for operating the aerosol generation device 100 including instructions for executing the selectable operating modes and controlling the power flows, and one or processors configured to execute the instructions.

In some examples, the first energy storage module 104 is a supercapacitor module 104 and the second energy storage module 106 is a battery module 106. In other examples the second energy storage module 106 is also a supercapacitor module (i.e. a second supercapacitor module) 106.

In an example, a heater 108 is contained with the body portion 112. In such an example, as shown in FIG. 1, the heater 108 is arranged in a cavity 110 or chamber in the body portion 112. The cavity 110 is accessed by an opening 110A in the body portion 112. The cavity 110 is arranged to receive an associated aerosol generating consumable 114. The aerosol generating consumable can contain an aerosol generating material, such as a tobacco rod containing tobacco. A tobacco rod can be similar to a traditional cigarette. The cavity 110 has cross-section approximately equal to that of the aerosol generating consumable 114, and a depth such that when the associated aerosol generating consumable 114 is inserted into the cavity 110, a first end portion 114A of the aerosol generating consumable 114 reaches a bottom portion 1108 of the cavity 110 (that is, an end portion 1108 of the cavity 110 distal from the cavity opening 110A), and a second end portion 114B of the aerosol generating consumable 114 distal to the first end portion 114A extends outwardly from the cavity 110. In this way, a consumer can inhale upon the aerosol generating consumable 114 when it is inserted into the aerosol generation device 100. In the example of FIG. 1, the heater 108 is arranged in the cavity 110 such that the aerosol generating consumable 114 engages the heater 108 when inserted into the cavity 110. In the example of FIG. 1, the heater 108 is arranged as a tube in the cavity such that when the first end portion 114A of the aerosol generating consumable is inserted into the cavity the heater 108 substantially or completely surrounds the portion of the aerosol generating consumable 114 within the cavity 110. The heater 108 can be a wire, such as a coiled wire heater, or a ceramic heater, or any other suitable type of heater. The heater 108 can comprise multiple heating elements sequentially arranged along the axial length of the cavity that can be independently activated (i.e. powered up) in a sequential order.

In an alternative embodiment (not shown), the heater can be arranged as an elongate piercing member (such as in the form of needle, rod or blade) within the cavity; in such an embodiment the heater can be arranged to penetrate the aerosol generating consumable and engage the aerosol generating material when the aerosol generating consumable is inserted into the cavity.

In another alternative embodiment (not shown), the heater may be in the form of an induction heater. In such an embodiment, a heating element (i.e., a susceptor) can be provided in the consumable, and the heating element is inductively coupled to the induction element (i.e., induction coil) in the cavity when the consumable is inserted into the cavity. The induction heater then heats the heating element by induction.

The heater 108 is arranged to heat the aerosol generating consumable 114 to a predetermined temperature to produce an aerosol in an aerosolisation session. An aerosolisation session can be considered as when the device is operated to produce an aerosol from the aerosol generating consumable 114. In an example in which the aerosol generating consumable 114 is a tobacco rod, the aerosol generating consumable 114 comprises tobacco. The heater 108 is arranged to heat the tobacco, without burning the tobacco, to generate an aerosol. That is, the heater 108 heats the tobacco at a predetermined temperature below the combustion point of the tobacco such that a tobacco-based aerosol is generated. The skilled person will readily understand that the aerosol generating consumable 114 does not necessarily need to comprise tobacco, and that any other suitable substance for aerosolisation (or vaporisation), particularly by heating without burning the substance, can be used in place of tobacco.

In an alternative, the aerosol generating consumable can be a vaporisable liquid. The vaporisable liquid can be contained in a cartridge receivable in the aerosol generation device, or can be directly deposited into the aerosol generation device.

The controller 102 is arranged to control the power flow of the first energy storage module 104 and the second energy storage module 106 based upon a selected operating mode of the aerosolisation session. The operating modes include a preheating mode, a float mode, and a post-float mode.

Figure 2:
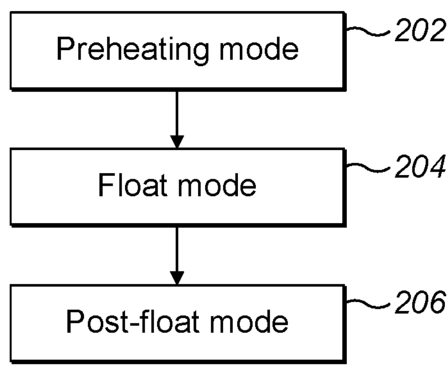
FIG. 2 is a flow diagram of operating modes of an aerosol generation device.

The progression from the preheating mode, to the float mode and then to the post-float mode can be understood from FIG. 2.

In the preheating mode 202, the heater 108 associated with the aerosol generation device 100 is heated to a predetermined temperature for the generation of an aerosol from the aerosol generating consumable 114. A preheating phase can be considered the time during which the preheating mode is being executed, for example the time it takes for the heater 108 to reach the predetermined temperature. The pre-heating mode occurs during a first time period of the aerosolisation session. In an example, the first time period can be a fixed pre-determined time period. In other examples, the first time period can vary corresponding to the length of time needed to heat the heater 108 to the predetermined temperature.

When the heater reaches the predetermined temperature, the controller 102 ends the preheating mode 202 and controls the power system to perform the float mode 204. In the float mode 204 the controller 102 controls the power flow from the power system to maintain the heater 108 substantially at the predetermined temperature so that an aerosol is generated for the consumer to inhale. A float phase can be considered the time during which the float mode is being executed, for example the time during which the heater 108 is aerosolising one (or at least part of one) aerosol generating consumable 114 after the preheating phase. The controller 102 can control the power system to operate the float mode for a second time period of the aerosolisation session. The second time period can be predetermined and stored at the controller 102.

Following the expiration of the second time period, the controller 102 switches the operating mode to the post-float mode 206. In the post-float mode the controller 102 disables the power flow from the power system to the heater so that the heater is no longer being powered. The heater retains residual heat energy despite the power flow having been disabled. This residual heat is used to continue heating the consumable in the post-float mode. A post-float phase can be considered the time during which the post-float mode is being executed. The post-float phase corresponds to a third time period of the aerosolisation session.

Figure 3:
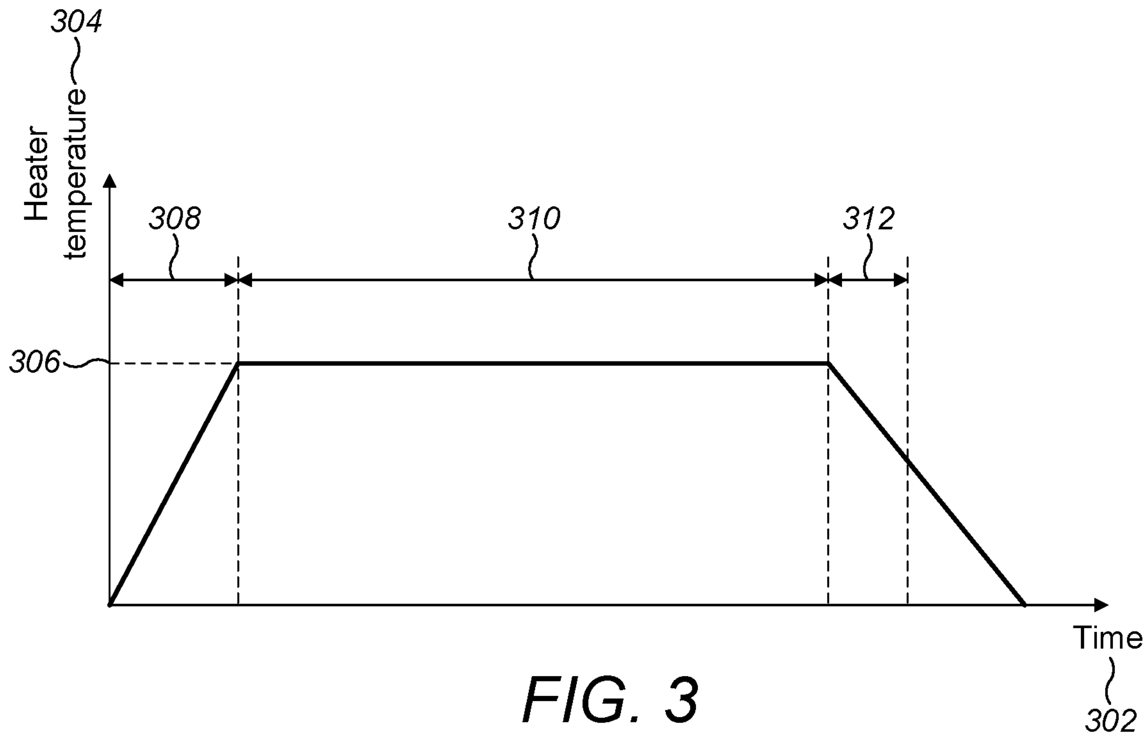
FIG. 3 is a plot of heater temperature against time for an aerosolisation session.

FIG. 3 shows an exemplary plot of heater temperature 304 against time 302. In the pre-heating phase the controller 102 controls the power system to apply power to the heater for the first time period 308, until the heater temperature reaches the predetermined temperature 306. In an example, the predetermined temperature is 230° C. In an example, the first time period is 20 seconds. In some examples, the controller 102 is configured to heat the heater to the predetermined temperature within a fixed predetermined first time period. In other examples the first time period varies depending on how long the heater takes to reach the predetermined temperature.

When the heater reaches the predetermined temperature 306, the controller 102 switches the operating mode to the float mode for the second time period 310 and maintains the heater temperature substantially at the predetermined temperature 306 for this second time period 310. In an example, the second time period may be 250 seconds.

Following the expiration of the second time period 310, the controller 102 switches the operating mode to the post-float mode for the third time period 312. As the third time period 312 progresses, the heater temperature drops as power is no longer being applied. The third time period 312 can be configured such that its expiration coincides with the heater temperature dropping below a threshold. This threshold can correspond to a temperature above ambient temperature, but below which the consumable is no longer usefully being heated. In an example, the third time period may be 20 seconds.

Following the expiration of the third time period 312 the user of the aerosol generation device may be informed that the aerosolisation session has ended, by way of a visual or audible indicator, so that they are aware that the consumable is no longer being aerosolised.

Figure 4:
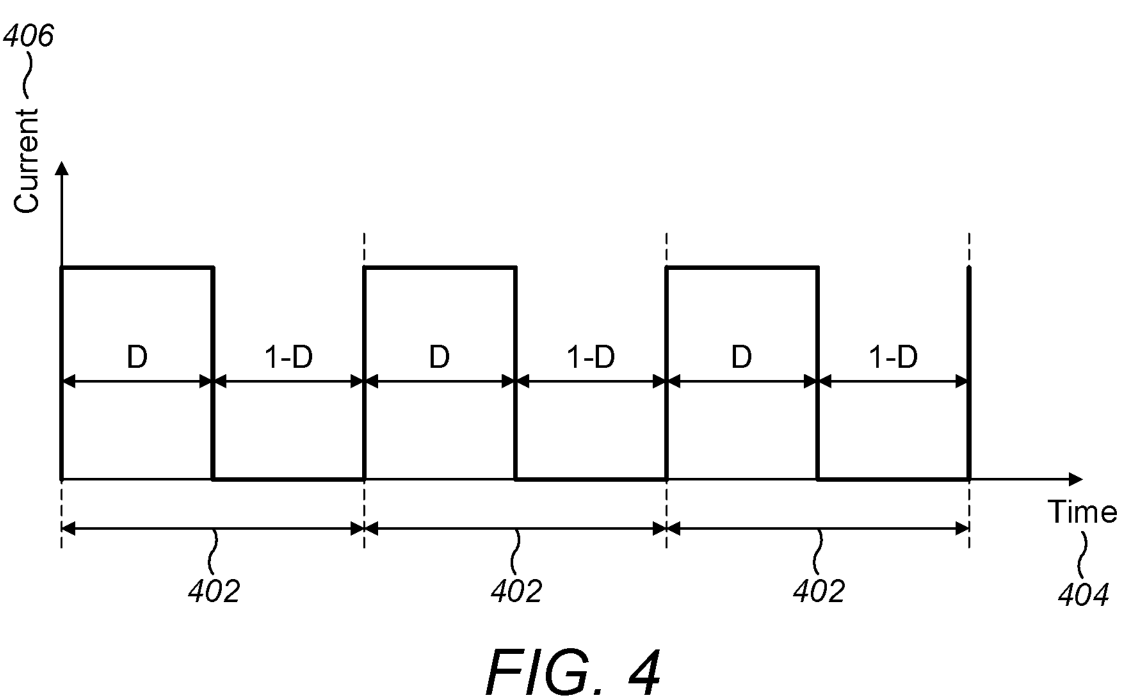
FIG. 4 is a plot of a pulse width modulated power flow.

In the preheating and float modes, the controller 102 controls the power flow from the power system to the heater such that the power flow is a pulse width modulated power flow having one or more pulse width modulation cycles. An exemplary pulse width modulated power flow is presented in FIG. 4. A pulse width modulated power flow comprises one or more pulse width modulation (PWM) cycles 402 (also known as pulse width modulation switching periods). A single PWM cycle, or switching period, 402 comprises one PWM cycle "on period" D and one PWM cycle "off period" 1−D. The combination of the PWM cycle on period D and the PWM cycle off period 1−D forms the overall PWM cycle or switching period 402.

During the PWM on period of the PWM cycle, power is applied to the heater, that is a power line to heater is closed by a switch that implements the PWM control. During the PWM off period power is not applied to heater, that is the power line to the heater is opened by a switch that implements the PWM control. As such, one pulse width modulation cycle 402 comprises the power being switched once between an on state and an off state, and a pulse width modulated power flow therefore comprises continuously powering the heater with a power flow which is rapidly switched between PWM on periods and off periods with a duty cycle.

The pulse width modulation duty cycle corresponds to the on period (D) as a proportion of the total period (D+(1−D)) of the cycle 402 (i.e. the combined "on period" and "off period" of the switching period 402).

The pulse width modulated power flow, comprising a plurality of PWM cycles, continuously powers the heater with the average power of the PWM on period and the PWM off period based upon the duty cycle. Controlling the duty cycle controls the amount of power delivered to the heater. A higher duty cycle for the pulse width modulated power flow delivers a higher average power; a lower duty cycle for the pulse width modulated power flow delivers a lower average power. That is, for a higher duty cycle a greater proportion of the cycle 402 is the "on period" D than for a lower duty cycle. In this way, careful control of the level of power applied to the heater can be achieved by controlling the duty cycle of the pulse width modulated power flow.

In the float mode, the controller 102 is configured to control the power system to apply the pulse width modulated power flow to the heater with a first duty cycle regime to maintain the heater substantially at the predetermined aerosol generation temperature. In the preheating mode, the controller 102 is configured to control the power system to apply the pulse width modulated power flow to the heater with a second duty cycle regime, different to the first duty cycle regime, to heat the heater to the aerosol generation temperature. The second duty cycle regime can have a higher duty cycle than the first duty cycle regime, in this way a greater amount of power is applied to the heater to rapidly heat it to the predetermined temperature, whilst a lower amount of power is used to maintain the heater at the predetermined temperature. The first duty cycle regime comprises one or more PWM cycles with a first duty cycle ratio D1, and the second duty cycle regime comprises one or more PWM cycles with a second duty cycle ratio D2; the relationship between D1 and D2 can be considered as D2=D1*K, where K is a coefficient that is >>1 and can be selected as an implementation choice; the theoretical maximum duty cycle is 1 with no off period, or close to but less than 1 with a very short off period. In examples, the first duty cycle regime comprises one or more duty cycles with duty cycle ratios much less than 1 and the second duty cycle regime comprises one or more duty cycles with duty cycle ratios near to but less than 1. In other examples, the first duty cycle regime comprises one or more duty cycles with duty cycle ratios<<0.5 and the second duty cycle regime comprises one or more duty cycles with duty cycle ratios≥0.5. In further examples, the first duty cycle is configured such that <3 W is applied in the float mode, and the second duty cycle is configured such that approximately 16 W is applied in the preheating mode.

In some examples, the PWM power flow in the float mode can be considered a first PWM power flow, and the PWM power flow in the pre-heating mode can be considered a second PWM power flow.

In the float mode the controller 102 is configured to control the second energy storage module to charge the first energy storage module during the pulse width modulation cycle off period. More specific implementations of this concept are described with reference to FIGS. 5A-C, 6 and 7. In this way, the first energy storage module can be incrementally charged during the float mode thereby increasing the time for which it is able to power the heater. This allows the first energy storage module to be smaller.

In the post-float mode, the controller 102 is configured to control the second energy storage module 106 to constantly charge the first energy storage module 106 until the first energy storage module 104 is fully charged. In this way, the first energy storage module is sufficiently charged for the pre-heating mode in a subsequent aerosolisation session.

Figure 5A:
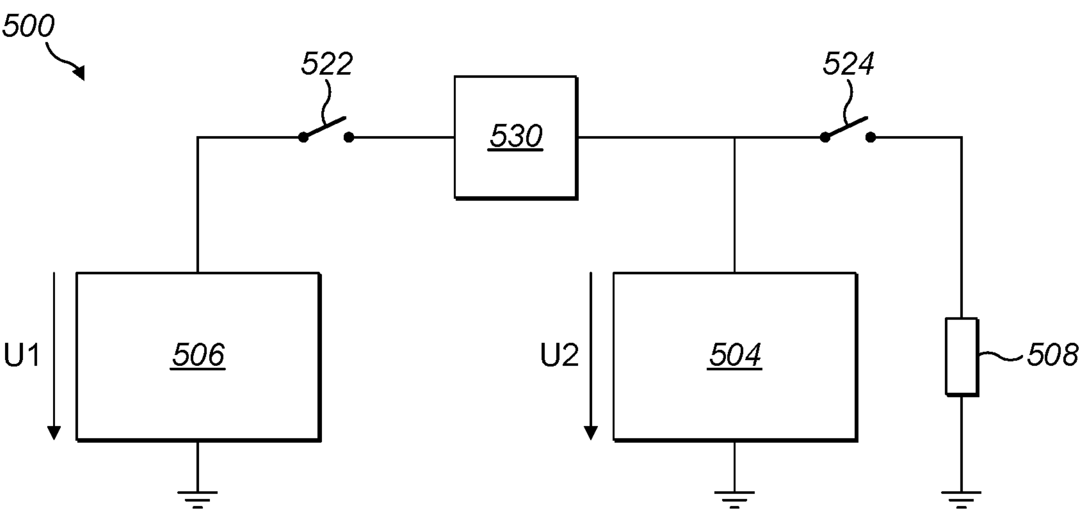
FIG. 5A is a circuit diagram of a power system comprising a supercapacitor module and a battery module.

FIG. 5A presents a first specific implementation of the power system 500 described with reference to FIGS. 1 to 4.

In the power system 500 of FIG. 5A, the first energy storage module 504 is a supercapacitor module 504 and the second energy storage module 506 is a battery module 506. The supercapacitor module 504 comprises one or more supercapacitors, and the battery module 506 comprises one or more batteries.

In a specific example, the supercapacitor module 504 can be implemented as two supercapacitors connected in series. These supercapacitors can be traditional-type supercapacitors and each can have a voltage of 2.5 V thereby providing the supercapacitor module 504 with a total voltage of 5 V. As such, the voltage (U2) of the supercapacitor module 504 can be 5 V. In other examples, a plurality of supercapacitors can be connected in series to meet the voltage requirements needed for powering the heater. Connecting a plurality of smaller supercapacitors in series, rather than using a single larger supercapacitor, is advantageous in allowing greater design flexibility.

The battery module 506 can be implemented as a single battery. This can be a high energy battery, such as a battery using lithium-ion technology, aluminium-ion technology, or zinc-ion technology, or any other suitable type of battery. Alternatively, the battery module can comprise a plurality of batteries. In a specific example, the battery is a lithium-ion battery with a voltage of 3.7 V. As such, the voltage (U1) of the battery module 506 can be 3.7 V. The battery module 506 can be integrated into the aerosol generation device 100. In other examples, the battery module 506 can be a power bank that is attachable/detachable from the aerosol generation device 100 rather than a battery specifically integrated into the device 100. The battery module 506 need not exclusively be an integrated battery or a separate power bank, rather the battery module can utilise a combination of the two; when the integrated battery is fully discharged the power bank can be connected and the aerosolisation session can be performed without first needing to recharge the integrated battery.

The supercapacitor module 504 and the battery module 506 are connected in parallel with a DC/DC voltage converter 530 arranged between the two. The DC/DC voltage converter 530 is arranged to step up the battery module voltage in order to charge the supercapacitor module 504 from the battery module 506. A first switching means 522 is arranged between the battery module 506 and the converter 530. The supercapacitor module 504 is connectable to the heater 508, represented as the load 508, in parallel with a second switching means 524 arranged between the two. The heater 508 is not itself a component of the power system 500, but rather is powered by the power system 500. The first switching means 522 and the second switching means 524 can be transistors connected to the controller 102 (not shown in FIG. 5A).

During the preheating mode and the float mode, controlling the pulse width modulated power flow of the power system 500 comprises controlling the supercapacitor module 504 to power the heater 508 and the battery module 506 to recharge the supercapacitor module 504. Only the supercapacitor module 504 powers the heater 508 in the preheating mode and the float mode; the battery module 506 recharges the supercapacitor module 504. During the PWM cycle on periods of the pulse width modulated power flow, the supercapacitor module 504 powers the heater, and during the PWM cycle off periods the battery module 506 recharges the supercapacitor module 504. That is, during the preheating mode and the float mode the supercapacitor module 504 switches between powering the heater 508 during the on portion of the duty cycle, and being recharged by the battery module 506 during the off portion of the duty cycle. The battery module 506 does not charge the supercapacitor module 504 during the on portion of the duty cycle.

The pulse width modulated power flow in the float mode operates with a first duty cycle regime that comprises one or more PWM cycles with a first duty cycle ratio D1. In the preheating mode, the supercapacitor module 504 powers the heater 508 with a pulse width modulated power flow with a second duty cycle regime that comprises one or more PWM cycles with a second duty cycle ratio D2. The relationship between D1 and D2 can be considered as D2=D1*K, where K is a coefficient that is >>1 and can be selected as an implementation choice. In an example, the first duty cycle ratio can be much less than 1, and the second duty cycle ratio can be close to but less than 1. In other examples, the first duty cycle ratio can be <<0.5 and the second duty cycle ratio can be ≥0.5. In further examples, the first duty cycle is configured such that <3 W is applied in the float mode, and the second duty cycle is configured such that approximately 16 W is applied in the preheating mode.

The controller 102, the first switching means 522, and the second switching means 524 bring about this control over the heating and charging. During the PWM cycle on periods of the pulse width modulated power flow, the controller 102 controls the second switching means 524 to be closed and the first switching means 522 to be open. In this way, power flows from the supercapacitor module 504 to the heater 508 during the PWM on period whilst the battery module 506 is isolated from the supercapacitor module 504 and the heater 508. During the PWM cycle off periods of the pulse width modulated power flow, the controller 102 controls the second switching means 524 to be open and the first switching means 522 to be closed. In this way, power flows from the battery module 506 into the supercapacitor module 504 to recharge the supercapacitor module 504 whilst the supercapacitor module 504 is isolated from the heater 508. As such, during the pulse width modulated power flow, a rapid switching occurs between powering the heater 508 in the PWM cycle on periods and recharging the supercapacitor module 504 in the PWM cycle off periods.

In some examples, there may be a small delay between opening the first switching means 522 and closing the second switching means 524. This prevents the power flow from the battery module 506 inadvertently reaching the heater 508 during the on period of the duty cycle of the pulse width modulated power flow.

Figure 5B:
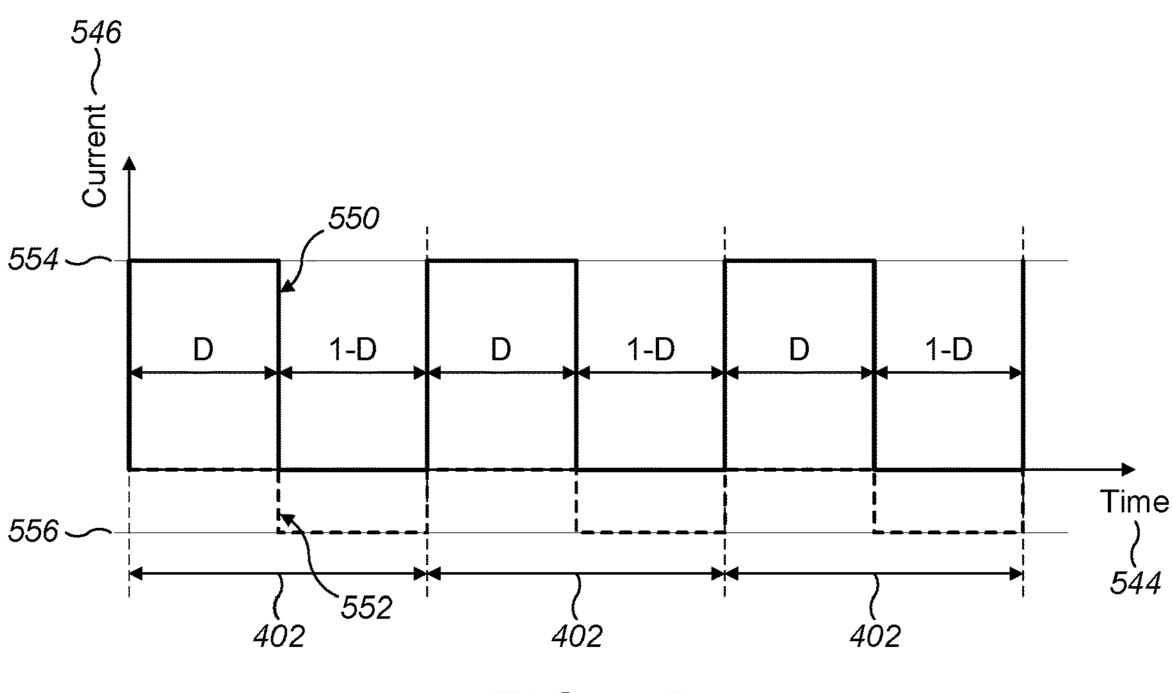
FIG. 5B is a plot of current against time for a pulse width modulated power flow into and out of the supercapacitor module of the power system of FIG. 5A.

FIG. 5B shows a plot of current 546 against time 544 for the pulse width modulated power flow into and out of the supercapacitor module during an exemplary portion of the preheating mode or the float mode. During the PWM cycle on period (D) of the switching period 402, power flows out of the supercapacitor module 504 with a first amplitude 554. The solid line 550 indicates the power flow out of the supercapacitor module 504, and the punctuated line 552 indicates the power flow into the supercapacitor module 504. During the PWM cycle off period (1−D) power flows into the supercapacitor module 504 with a second amplitude 556. In this way, the power flow 552 into the supercapacitor module 504 during the PWM cycle off period (1−D) at least partially compensates for the power flow 550 out of the supercapacitor module 504 during the PWM cycle on period. In an example, the first amplitude 554 is 10 A and the second amplitude 556 is 2 A.

During the post-float mode, the controller 102 controls the first switching means 522 to be closed and the second switching means 524 to be open. As such, the power flow to the heater 508 is disabled and the supercapacitor module 504 no longer powers the heater 508. As the first switching means 522 is closed, the battery module 506 constantly charges the supercapacitor module 504 until the supercapacitor module 504 is fully charged. In this way, the supercapacitor module 504 will have an adequate charge level for the pre-heating mode of a subsequent aerosolisation session.

Figure 5C:
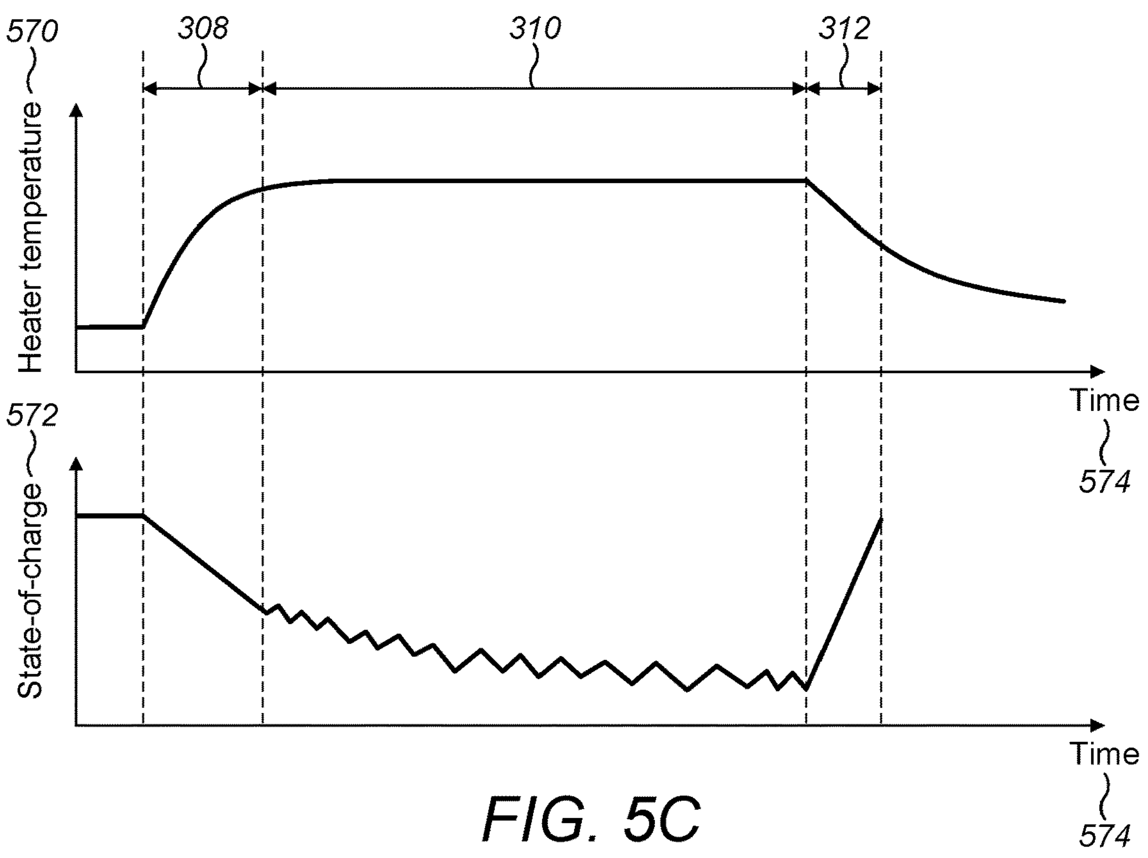
FIG. 5C is a dual plot of heater temperature against time and the state of charge of the supercapacitor module against time for an aerosolisation session using the power system of FIG. 5A.

FIG. 5C shows a dual plot of the temperature 570 of the heater 508 against time 574, and the corresponding state of charge 572 of the supercapacitor module 504 against time 574 for the aerosolisation session comprising the preheating mode 308, the float mode 310 and the post-float mode 312.

During the preheating mode 308, the heater 508 is powered by the supercapacitor module 504, for example with a high duty cycle, and the temperature of the heater 508 increases to the predetermined temperature; during this pre-heating 308, the charge level of the supercapacitor module 504 drops as it powers the heater 508.

In the float mode 310 the heater 508 is powered by the supercapacitor module 504 and maintained at the predetermined temperature. As described, the pulse width modulated power flow is configured such that the supercapacitor module 504 applies power to the heater 508 during the PWM cycle on period, and the battery module 506 recharges the supercapacitor module during the PWM cycle off period. As such, the charge level of the supercapacitor module 504 drops during the PWM cycle on periods, and raises during the PWM cycle off periods of the pulse width modulated power flow. This is visually represented by the rising and falling of the supercapacitor module 504 charge level 572 as a function of time 574 in FIG. 5C, during the float mode 310. As the inflow of charge to the supercapacitor module 504 from the battery module 506 during the PWM cycle off periods does not completely balance the outflow of charge to the heater 508 during the PWM cycle on periods, the charge level of the supercapacitor module 504 has an overall downward trend over the course of the float mode 310. This overall decrease in the charge level of the supercapacitor module 504 is slower than if the incremental charging during the PWM cycle off period were not be applied. As such, the supercapacitor module 504 is able to provide power to the heater 508 for a greater amount of time due to the incremental recharging during the PWM cycle off period.

In the post-float mode 312 the supercapacitor module 504 is no longer powering the heater 508 and as such the heater temperature drops. During the post-float mode, and beyond if needed, the battery module 506 is constantly charging the supercapacitor module 504 thereby increasing charge level of the supercapacitor module 504 until it is fully charged. The battery module 506 can slowly charge the supercapacitor module 504, thereby only requiring a low maximum current; this reduces the stress on the battery and improves its longevity.

The battery module 506 is capable of storing enough charge to recharge the supercapacitor module 504 for a plurality of aerosolisation sessions. When the charge level in the battery module 506 is depleted, the device 100 can be connected to a separate external power source such as a mains charger, a USB charger or a power bank to recharge the battery module 506.

In examples in which a power bank can be connected to the aerosol generation device 100, the power bank can act as the battery module 506 and can charge the supercapacitor module 504 during the PWM cycle off periods of the pulse width modulated power flow. In this way, if the internal battery module has depleted charge, an aerosolisation session can still be performed, but with the power bank performing the operations otherwise performed by the internal battery module. This allows the operator to perform an aerosolisation session without having to first charge the internal battery module.

The pulse width modulated power regime, powering the heater 508 with the supercapacitor module 504 during the PWM cycle on periods of the pulse width modulated power flow, and recharging supercapacitor module 504 with the battery module 506 during the PWM cycle off periods of the pulse width modulated power flow, is advantageous as the incremental recharging during the off period ensures that the supercapacitor module 504 continues to have enough charge to power the heater throughout the float mode. Furthermore, this incremental recharging of the supercapacitor module 504 means that the supercapacitor module has low energy/capacity requirements (in an example <0.05 Wh is needed per aerosolisation session) thereby allowing smaller sized supercapacitors to be used, which reduces costs and improves safety.

Without the recharging during the PWM cycle off period, the charge level of the supercapacitor would run low sooner and prevent the supercapacitor module 504 from being able to power the heater 508 for the entire float mode without the additional support of a power flow from a battery to the heater 508.

Powering a heater directly with a battery, or supporting the power flow from a supercapacitor to a heater with a power flow from a battery to the heater can be disadvantageous if a step-up converter is required due to a battery typically having a lower voltage level than that required to power the heater. Such a step-up converter can introduce losses to the system. As the supercapacitor module 504 has a higher voltage level than a battery, a step-up converter is not needed when powering the heater only with the supercapacitor module 504. This obviates the losses associated with such a loss-inducing step-up.

In another advantage, the supercapacitor module 504 has a lower internal resistance than a typical battery thereby reducing losses in the system compared to a system in which the heater is powered by a battery.

Figure 6:
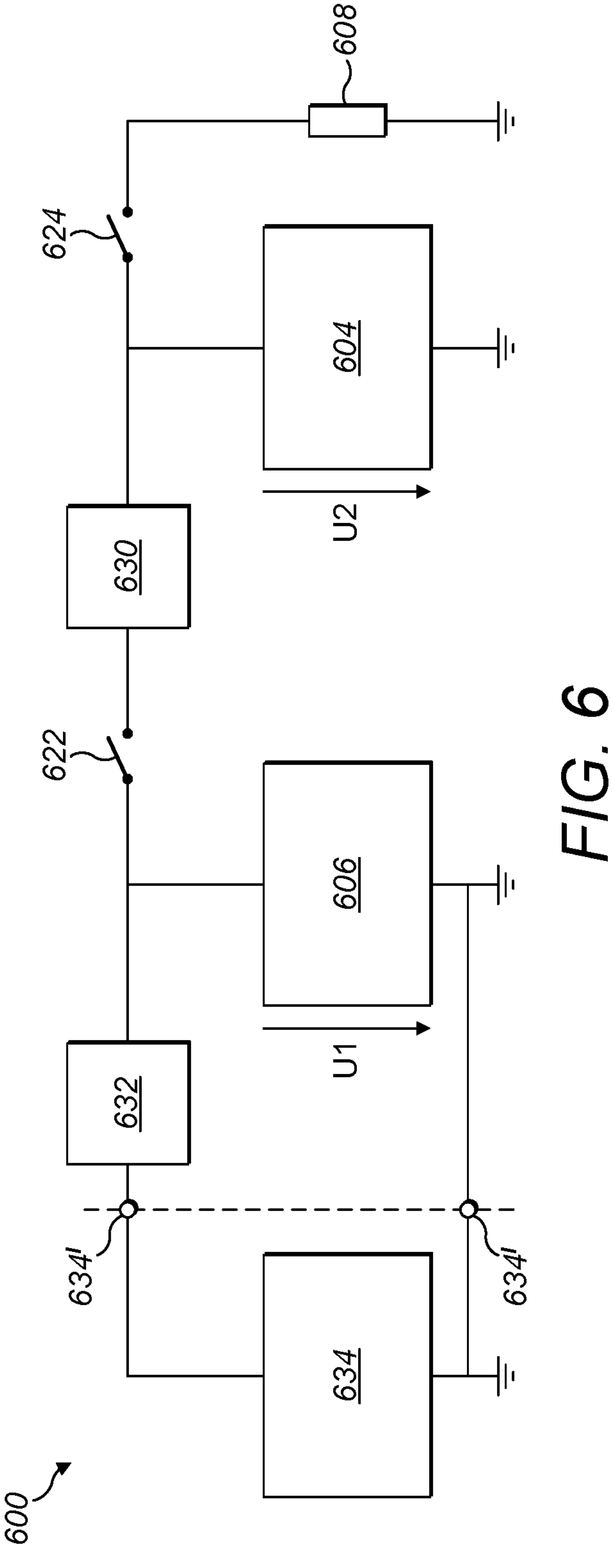
FIG. 6 is a circuit diagram of a power system comprising a first supercapacitor module and a second supercapacitor module.

FIG. 6 presents a second specific implementation of the power system 600 described with reference to FIGS. 1 to 4.

In the power system 600 of FIG. 6, the first energy storage module 604 is a first supercapacitor module 604 and the second energy storage module 606 is a second supercapacitor module 606. The first supercapacitor module 604 comprises at least one supercapacitor. In a specific example, the first supercapacitor module 604 can be implemented as two supercapacitors connected in series. These supercapacitors can be traditional-type supercapacitors and each can have a voltage of 2.5 V thereby providing the first supercapacitor module 604 with a total voltage of 5 V. As such, the voltage (U2) of the first supercapacitor module 604 can be 5 V. The second supercapacitor module 606 comprises at least one hybrid capacitor (also known as a hybrid supercapacitor). A hybrid capacitor has higher operating voltage, higher capacitance and higher energy density than the (traditional) supercapacitor(s) of the first supercapacitor module 604. However, a hybrid capacitor has lower power capability than the (traditional) supercapacitor(s) of the first supercapacitor module 604. In a specific example, the second supercapacitor module 604 can be implemented as a hybrid capacitor having a voltage of 3.7 V. As such, the voltage (U1) of the second supercapacitor module 606 can be 3.7 V.

The power system 600 does not comprise a battery, but does further comprise electrical connectors 634' configured to connect an external charging component 634 that can comprise a battery module.

The external charging component 634 is separate from, but connectable to, the aerosol generation device 100 comprising the power system 600. That is, the aerosol generation device is a handpiece that comprises the power system 600, with the handpiece connectable to the separate external charging component 634. Because there is no battery in the aerosol generation device 100 (i.e. there is no battery in the handpiece), the consumer does not bring a battery close to their mouth during an aerosolisation session. This provides improved safety measures.

In a specific example, the external charging component 634 is a portable charging case. The charging case is dimensioned to receive and accommodate the aerosol generation device within a chamber. The charging case comprises a battery which connects to the connectors 634' when the aerosol generation device is received in the charging case. In this way, when the operator inserts the aerosol generation device into the charging case, the power system 600 is brought into connection with the battery comprised in the charging case, and the battery quickly charges the second supercapacitor module 606. The battery can store enough energy to fully recharge the second supercapacitor module 606 a plurality of times. The battery of the charging case can itself be charged from an external power source, such as a power bank or mains source, by a connection such as a USB cable, or through connection to a docking station. In an example use process, the operator removes the aerosol generation device from the charging case, where it has been charging, carries out an aerosolisation session (or a plurality of aerosolisation sessions), and then reinserts the aerosol generation device into the charging case so that the second supercapacitor module 606 is charged for future aerosolisation sessions. The second supercapacitor module 606 can be configured to store enough charge for a first predetermined number of aerosolisation sessions or puffs. The portable charging case can be configured to store enough charge to recharge the second supercapacitor module 606 for a second predetermined number of aerosolisation sessions or puffs that is greater than the first predetermined number of aerosolisation sessions of puffs.

In other examples, the external charging component 634 is a power bank, with a battery, that itself can be rechargeable. In another example, the external charging component 634 is docking station, with a battery that itself can be rechargeable, or that can be externally powered for example from a mains supply. The power bank or docking station can be portable.

A DC/DC voltage converter 632 is positioned between the electrical connectors 634' and the second supercapacitor module 606. This is configured to appropriately convert the voltage from the external charging component 634 to the power system 600.

The first supercapacitor module 604 and second supercapacitor module 606 are connected in parallel with a DC/DC voltage converter 630 arranged between the two. The DC/DC voltage converter 630 is arranged to step up the second supercapacitor module voltage in order to charge the first supercapacitor module 604 from the second supercapacitor module 606. A first switching means 622 is connected between the first supercapacitor module 604 and the second supercapacitor module 606. The first switching means 622 is controlled by the controller 102 (not shown in FIG. 6) to control the second supercapacitor module 606 to charge the first supercapacitor module 604. A second switching means 624 is configured to be arranged between the first supercapacitor module 604 and the heater 608. The second switching means 624 is controlled by the controller 102 to control a power flow from the first supercapacitor module 604 to the heater 608. In an example, the first switching means 622 and the second switching means 624 are transistors controlled by the controller 102. The heater 608 is not itself a component of the power system 600, but rather is powered by the power system 600.

During the preheating mode and the float mode, controlling the pulse width modulated power flow of the power system 600 comprises controlling the first supercapacitor module 604 to power the heater 608 and the second supercapacitor module 606 to recharge the first supercapacitor module 604. Only the first supercapacitor module 604 powers the heater 608 in the preheating mode and the float mode; the second supercapacitor module 606 recharges the first supercapacitor module 604. During the PWM cycle on periods of the pulse width modulated power flow, the first supercapacitor module 604 powers the heater 608, and during the PWM cycle off periods the second supercapacitor module 606 recharges the first supercapacitor module 604. That is, during the preheating mode and the float mode the first supercapacitor module 604 switches between powering the heater 608 during the on portion of the duty cycle, and being recharged by the second supercapacitor module 606 during the off portion of the duty cycle. The second supercapacitor module 606 does not charge the first supercapacitor module 604 during the on portion of the duty cycle.

The pulse width modulated power flow in the float mode operates with a first duty cycle regime that comprises one or more PWM cycles with a first duty cycle ratio D1. In the preheating mode, the first supercapacitor module 604 can power the heater 608 with a pulse width modulated power flow with a second duty cycle regime that comprises one or more PWM cycles with a second duty cycle ratio D2. The relationship between D1 and D2 can be considered as $D2=D1*K$, where K is a coefficient that is $>>1$ and can be selected as an implementation choice. In an example, the first duty cycle ratio can be much less than 1, and the second duty cycle ratio can be close to but less than 1. In other examples, the first duty cycle ratio can be $<<0.5$ and the second duty cycle ratio can be $\geq 0.5$. In further examples, the first duty cycle is configured such that <3 W is applied in the float mode, and the second duty cycle is configured such that approximately 16 W is applied in the preheating mode.

The controller 102, the first switching means 622, and the second switching means 624 bring about this control over the heating and charging. During the PWM cycle on periods of the pulse width modulated power flow, the controller 102 controls the second switching means 624 to be closed and the first switching means 622 to be open. In this way, power flows from the first supercapacitor module 604 to the heater 608 during the PWM cycle on period whilst the second supercapacitor module 606 is isolated from the first supercapacitor module 604 and the heater 608. During the PWM cycle off periods of the pulse width modulated power flow, the controller 102 controls the second switching means 624 to be open and the first switching means 622 to be closed. In this way, power flows from the second supercapacitor module 606 into the first supercapacitor module 604 to recharge the first supercapacitor module 604 whilst the first supercapacitor module 604 is isolated from the heater 608. As such, during the pulse width modulated power flow, a rapid switching occurs between powering the heater 608 in the PWM cycle on periods and recharging the first supercapacitor module 604 in the PWM cycle off periods.

In some examples, there may be a small delay between opening the first switching means 622 and closing the second switch means 624. This prevents the power flow from the second supercapacitor module 606 inadvertently reaching the heater 608 during the on period of duty cycle of the pulse width modulated power flow.

In a variation on the arrangement described with reference to FIG. 6, both the first supercapacitor module 604 and the second supercapacitor module 606 can power the heater during the PWM cycle on period, and the second supercapacitor module 606 can charge the first supercapacitor module 604 during the PWM cycle off period. This can be brought about by the first switching means 622 and the second switching means 624 both being closed during the PWM cycle on period, and the second switching means 624 being open and the first switching means 622 being closed during the PWM off period. In this way, the second supercapacitor module 606 can be used to boost the power flow to the heater during the PWM on period. This can allow for a smaller first supercapacitor module 604 to be used.

The powering of the heater 608 by the first supercapacitor module 604 during the PWM cycle on period of the pulse width modulated power flow, and the at least partial recharging of the first supercapacitor module 604 by the second supercapacitor module 606 during the PWM cycle off period of the pulse width modulated power flow can be visually understood in a similar manner to the plot of FIG. 5B. The skilled person will however understand that in this case, the solid line 550 would represent the power flow out of the first supercapacitor module 604 during the PWM cycle on period (D) of the pulse width modulated power flow, and the punctuated line 552 would represent the power flow into the first supercapacitor module 604 from the second supercapacitor module 606 during the PWM cycle off period (1−D) of the pulse width modulated power flow.

During the post-float mode, the controller 102 controls the first switching means 622 to be closed and the second switching means 624 to be open. As such, the power flow to the heater 608 is disabled and the first supercapacitor module 604 no longer powers the heater 608. As the first switching means 622 is closed, the second supercapacitor module 606 constantly charges the first supercapacitor module 604 until the first supercapacitor module 604 is fully charged. In this way, the first supercapacitor module 604 will have an adequate charge level for the pre-heating mode of a subsequent aerosolisation session.

The skilled person will understand that the dual plot of FIG. 5C can also provide a representation of the state of charge 572 (i.e. the charge level) of the first supercapacitor module 604, and the temperature of the heater 608, as the first supercapacitor module 604 powers the heater 608 and is recharged by the second supercapacitor module 606 in the preheating mode 308 and the float mode 310, and is recharged by the second supercapacitor module 606 in the post-float mode 312.

The second supercapacitor module 606 (for example comprising the hybrid capacitor) is capable of storing enough charge to recharge the first supercapacitor module 604 for a plurality of aerosolisation sessions. When the charge level in the second supercapacitor module 606 is depleted, the aerosol generation device 100 can be connected to the external charging component 634 by way of the electrical connectors 634'. The external charging component 634 then recharges the second supercapacitor module 606. In this way, the operator of the aerosol generation device 100 can execute multiple aerosolisation sessions before connecting the aerosol generation device 100 to the external charging component 634 (such as a power bank or dock). This allows for a reduced size aerosol generation device 100 that is more comfortable to handle, with improved safety, as there is no battery in the aerosol generation device itself. In some examples, the aerosol generation device can be connected to the external charging component, with suitable power connectors and electronics, and an aerosolisation session can be performed using the external charging component in place of the second supercapacitor module.

A DC/DC converter 632 is arranged between the charging component 634 and the second supercapacitor module 606. This DC/DC converter 632 is configured to step-up the voltage of the external charging component 634 so as to charge the second supercapacitor module 606.

Figure 7A:
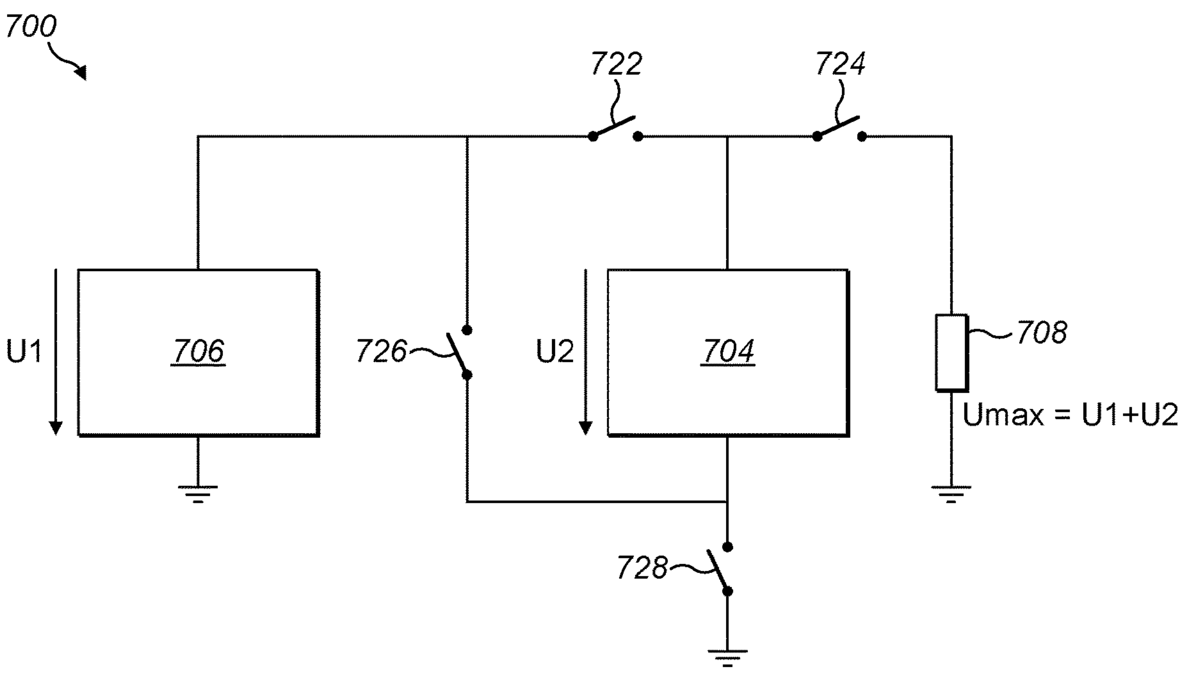
FIG. 7A is a circuit diagram of a power system comprising a supercapacitor module and a battery module.

FIG. 7A presents a third specific implementation of the power system described with reference to FIGS. 1 to 4.

In the power system 700 of FIG. 7, the first energy storage module 704 is a supercapacitor module 704 and the second energy storage module 706 is a battery module 706. The supercapacitor module 704 comprises at least one supercapacitor. In a specific example, the supercapacitor module 704 can be implemented as a 3.7 V supercapacitor. As such, the voltage (U2) of the supercapacitor module 704 can be 3.7 V. In alternatives, the supercapacitor module 704 can comprise two or more supercapacitors connected in series. The battery module 706 can be implemented as a single battery. This can be a high energy battery, such as a battery using lithium-ion technology, aluminium-ion technology, or zinc-ion technology, or any other suitable type of battery. Alternatively, the battery module can comprise a plurality of batteries. In a specific example, the battery is a lithium-ion battery with a voltage of 3.7 V. As such, the voltage (U1) of the battery module 706 can be 3.7 V.

Figure 7B:
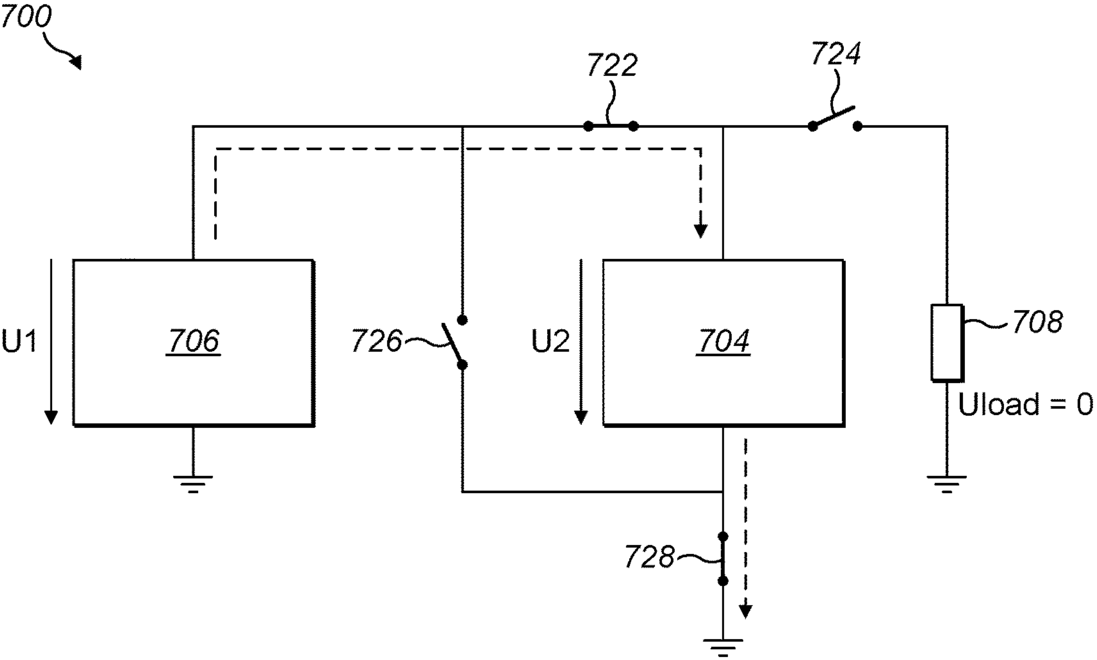
FIG. 7B is a circuit diagram of the power system of FIG. 7A in a first configuration.
Figure 7C:
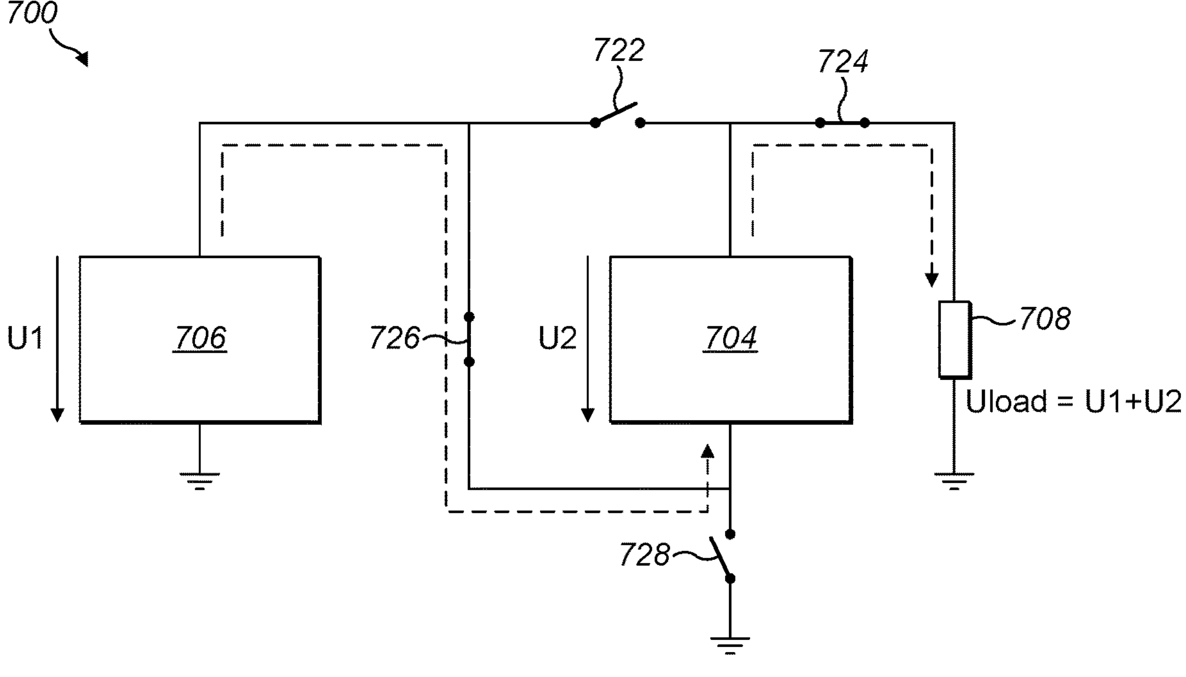
FIG. 7C is a circuit diagram of the power system of FIG. 7A in a second configuration.

The supercapacitor module 704 and battery module 706 are connected in a switchable configuration such they are connected in parallel in a first configuration (as shown in FIG. 7B), and in series in a second configuration (as shown in FIG. 7C). This switchable configuration is brought about by a first switching means 722, a second switching means 724, a third switching means 726 and a fourth switching means 728. These switching means can be transistors, and can be controlled by the controller 102 (not shown in FIGS. 7A-C).

In the first configuration, the first switching means 722 and the fourth switching means 728 are closed, whilst the second switching means 724 and the third switching means 726 are open. In this way, the battery module 706 and supercapacitor module 704 are connected in parallel and isolated from the heater. As such, power flows from the battery module 706 into the supercapacitor module 704 to charge the supercapacitor module 704. As the second switching means 724 is open, no power flows to the heater 708 and hence no load is applied. The heater 708 is not itself a component of the power system 700, but rather is powered by the power system 700.

In the second configuration, the first switching means 722 and the fourth switching means 728 are open, whilst the second switching means 724 and the third switching means 726 are closed. In this way, the battery module 706 and the supercapacitor module 704 are connected in series, and further connected to the heater 708. As such, the combined series power flow from both the battery module 706 and the supercapacitor module 704 flows to the heater 708 to power the heater 708. The load applied to the heater ($U_{LOAD}$) is therefore equal to the voltage of the battery module (U1) plus the voltage of the supercapacitor module (U2).

Controlling the pulse width modulated power flow of the power system 700 comprises the controller 102 switching the power system 700 between the second configuration (FIG. 7C) in the PWM cycle on periods of the pulse width modulated power flow, and the first configuration (FIG. 7B) in the PWM cycle off periods of the pulse width modulated power flow. In this way, during the PWM cycle on periods, both the battery module 706 and the supercapacitor module 704 power the heater 708, and in the PWM cycle off periods the battery module 706 recharges the supercapacitor module 704.

That is, in the PWM cycle on periods of the pulse width modulated power flow, the second switching means 724 and the third switching means 726 are closed, whilst the first switching means 722 and the fourth switching means 728 are open. In the PWM cycle off periods of the pulse width modulated power flow, the second switching means 724 and the third switching means 726 are open, whilst the first switching means 722 and the fourth switching means 728 are closed.

When switching from the PWM cycle on periods to the PWM cycle off periods, the second switching means 724 and the third switching means 726 open, and the first switching means 722 and the fourth switching means 728 close. For safety reasons, there can be a small delay following the second switching means 724 and the third switching means 726 opening and first switching means 722 and the fourth switching means 728 closing. This prevents unwanted current flow.

Likewise, when switching from the PWM cycle off periods to the PWM cycle on periods, the first switching means 722 and the fourth switching means 728 open, and the second switching means 724 and the third switching means 726 close. Again, there can be a small delay following the first switching means 722 and the fourth switching means 728 open opening and the second switching means 724 and the third switching means 726 closing. This prevents unwanted current flow.

The controller 102 is connected to the first switching means 722, second switching means 724, third switching means 726 and fourth switching means 728 and is configured to switch each of these switching means between the first configuration and the second configuration for the pulse width modulated power flow to the heater 708. That is, the controller 102 is configured to switch these switching means 722, 724, 726, 728 between the first configuration in the PWM cycle off periods of the pulse width modulated power flow and the second configuration in the PWM cycle on periods of the pulse width modulated power flow to control the power system 700 to provide the heater 708 with the pulse width modulated power flow having the requisite duty cycle.

In some examples, the controller 102 is a single controller configured to control each of the first switching means 722, second switching means 724, third switching means 726 and fourth switching means 728. In other examples, the controller 102 can comprise a separate controllers connected to each of the first switching means 722, second switching means 724, third switching means 726 and fourth switching means 728, configured to operate in unison. In yet a further example, the controller 102 can comprise a first controller configured to control the first switching means 722 and the fourth switching means 728, and a second controller configured to control the second switching means 724 and the third switching means 726, with the first controller and second controller configured to operate in unison.

Using a supercapacitor module 704 and a battery module 706 with the same (or similar) voltages obviates the need for a DC/DC step-up voltage converter between the two, thereby reducing losses in the system. In another advantage, the series connection between the battery module 706 and the supercapacitor module 704 allows for their power flows to be combined to power the heater 708; in this way, a lower voltage supercapacitor and battery can be used. This allows the device to be smaller, with enhanced safety considerations.

During the preheating mode, controlling the pulse width modulated power flow of the power system 700 to the heater 708 comprises controlling the power system 700 to switch between the second configuration (FIG. 7C) in the PWM cycle on period of the pulse width modulated power flow and the first configuration (FIG. 7B) in the PWM cycle off period of the pulse width modulated power flow. In the preheating mode, the controller 102 is configured to switch the power system 700 between the first configuration and the second configuration such that the heater 708 is powered with a pulse width modulated power flow with a second duty cycle regime that comprises one or more PWM cycles with a second duty cycle ratio D2.

During the float mode, controlling the pulse width modulated power flow of the power system 700 comprises controlling the power system 700 to switch between the second configuration (FIG. 7C) in the PWM cycle on period of the pulse width modulated power flow and the first configuration (FIG. 7B) in the PWM cycle off period of the pulse width modulated power flow. In the float mode, the controller 102 is configured to switch the power system 700 between the first configuration and the second configuration such that the heater 708 is powered with a pulse width modulated power flow with a first duty cycle regime that comprises one or more PWM cycles with a first duty cycle ratio D1. In this way, during the float mode, the power system is controlled such that both the battery module 706 and the supercapacitor module 704 power the heater during the PWM cycle on periods of the pulse width modulated power flow, and the battery module 706 recharges the supercapacitor module during the off periods of the pulse width modulated power flow.

The relationship between D1 and D2 can be considered as $D2=D1*K$, where K is a coefficient that is $>>1$ and can be selected as an implementation choice. In an example, the first duty cycle ratio can be much less than 1, and the second duty cycle ratio can be close to but less than 1. In other examples, the first duty cycle ratio can be $<<0.5$ and the second duty cycle ratio can be $\geq 0.5$. In further examples, the first duty cycle is configured such that <3 W is applied in the float mode, and the second duty cycle is configured such that approximately 16 W is applied in the preheating mode.

The powering of the heater 708 by the supercapacitor module 704 and the battery module 706 during the PWM cycle on period of the pulse width modulated power flow, and the at least partial recharging of the supercapacitor module 704 by the battery module 706 during the PWM cycle off period of the pulse width modulated power flow can be visually understood in a similar manner to the plot of FIG. 5B. The skilled person will however understand that in this case, the solid line 550 would represent the power flow out of the supercapacitor module 704 during the on period (D) of the duty cycle of the pulse width modulated power flow, and the punctuated line 552 would represent the power flow into the supercapacitor module 704 from the battery module 706 during the off period (1−D) of the duty cycle of the pulse width modulated power flow.

During the post-float mode, the controller 102 controls the first switching means 722, second switching means 724, third switching means 726 and fourth switching means 728 such that the power system is constantly in the first configuration (FIG. 7B). As such, the power flow to the heater 708 is disabled and the battery module 706 constantly charges the supercapacitor module 704 until the supercapacitor module 704 is fully charged. In this way, the supercapacitor module 704 will have an adequate charge level for a subsequent aerosolisation session.

The skilled person will understand that the dual plot of FIG. 5C can also provide a representation of the state of charge 572 (i.e. the charge level) of the supercapacitor module 704, and the temperature 570 of the heater 708, during in the preheating mode 308, the float mode 310, and the post-float mode 312 for the power system 700. During the preheating mode 308, the temperature of the heater 708 increases to the predetermined temperature. During this pre-heating 308, the charge level of the supercapacitor module 704 drops as it powers the heater 708 for rapid heating. During the float mode 310, the temperature of the heater 708 is maintained at the predetermined temperature and the charge level of the supercapacitor module 704 drops during the PWM cycle on periods, and raises during the PWM cycle off periods of the pulse width modulated power flow. During the post-float mode 312, the battery module 706 is constantly charging the supercapacitor module 704 thereby increasing charge level of the supercapacitor module 704 until it is fully charged.

The battery module 706 is capable of storing enough charge to recharge the supercapacitor module 704 for a plurality of aerosolisation sessions. When the charge level in the battery module 706 is depleted, the aerosol generation device 100 can be connected to an external charging component or power source to recharge the battery module 706. In this way, the operator of the aerosol generation device 100 can execute multiple aerosolisation sessions before connecting the aerosol generation device 100 to the external charging component or power source.

In the preceding description, the controller 102 can store instructions for executing one or more of the operational modes, and can execute them as required. The skilled person will readily understand that the controller 102 can be configured to execute any of the aforementioned operating modes in combination with one another as appropriate. The processing steps described herein carried out by the controller 102 may be stored in a non-transitory computer-readable medium, or storage, associated with the controller 102. A computer-readable medium can include non-volatile media and volatile media. Volatile media can include semiconductor memories and dynamic memories, amongst others. Non-volatile media can include optical disks and magnetic disks, amongst others.

It will be readily understood to the skilled person that the preceding embodiments in the foregoing description are not limiting; features of each embodiment may be incorporated into the other embodiments as appropriate.

The invention claimed is:

1. An aerosol generation device comprising:

a power system comprising a first energy storage module and a second energy storage module; and a controller, wherein the controller is configured to:

control a pulse width modulated power flow of the power system to a heater associated with the aerosol generation device, wherein the pulse width modulated power flow comprises one or more pulse width modulation cycles each having an on period and an off period; and control the second energy storage module to charge the first energy storage module during the pulse width modulation cycle off period.

2. The aerosol generation device of claim 1, wherein the first energy storage module is a supercapacitor module and the second energy storage module is a battery module.

3. The aerosol generation device of claim 2, wherein the controller is further configured to:

control the power system to provide the pulse width modulated power flow from only the supercapacitor module to the heater during the pulse width modulation cycle on period.

4. The aerosol generation device of claim 2, wherein the controller is configured to:

control the battery module to not charge the supercapacitor module during the pulse width modulation cycle on period.

5. The aerosol generation device of claim 2, wherein the power system comprises the supercapacitor module connected in parallel with the battery module, with a voltage converter connected between the supercapacitor module and the battery module.

6. The aerosol generation device of claim 2, wherein the power system further comprises:

a first switching means connected between the battery module and the supercapacitor module, wherein the first switching means is configured to be controlled by the controller to control the battery module to charge the supercapacitor module during the off period of the pulse width modulation cycle; and a second switching means configured to be arranged between the supercapacitor module and the heater, wherein the second switching means is configured to be controlled by the controller to control the pulse width modulated power flow from the supercapacitor module to the heater.

7. The aerosol generation device of claim 1, wherein the first energy storage module is a supercapacitor module and the second energy storage module is a battery module; and in the on period, the controller controls the battery module and the supercapacitor module to power the heater; and in the off period, the controller controls the battery module to charge the supercapacitor module.

8. The aerosol generation device of claim 7, wherein the power system further comprises a switching means configured to switch the power system between a second configuration in the on period and a first configuration in the off period, wherein in the second configuration the supercapacitor module and battery module are connected in series, and first configuration the supercapacitor module and the battery module are connected in parallel.

9. The aerosol generation device of claim 7, wherein the power system is configured to apply a summed potential of the battery module and the supercapacitor module to the heater in the on period.

10. The aerosol generation device of claim 1, wherein the power system is operable in a plurality of selectable operating modes of an aerosolisation session, the plurality of operating modes comprising a float mode, wherein the controller is configured to:

control the power system to apply the pulse width modulated power flow to the heater with a first duty cycle regime to maintain the heater substantially at an aerosol generation temperature.

11. The aerosol generation device of claim 10, wherein the plurality of operating modes further comprises a pre-heating mode, wherein the controller is configured to:

control the power system to apply the pulse width modulated power flow to the heater with a second duty cycle regime, different to the first duty cycle regime, during a pre-heating mode before the float mode to heat the heater to the aerosol generation temperature.

12. The aerosol generation device of claim 11, wherein:

the first duty cycle regime comprises one or more pulse width modulation cycles with a first duty cycle ratio D1; and the second duty cycle regime comprises one or more pulse width modulation cycles with a second duty cycle ratio D2;

wherein $D2=D1\times K$, where K is a coefficient that is >1.

13. The aerosol generation device of claim 10, wherein the plurality of operating modes comprises a post-float mode, wherein the controller is configured to:

disable the pulse width modulated power flow to the heater following the float mode for a remaining time period in the aerosolisation session; and control the second energy storage module to charge the first energy storage module.

14. A method of controlling a power system of an aerosol generation device, the power system comprising a first energy storage module and a second energy module, and the method comprising:

controlling a pulse width modulated power flow of the power system to a heater associated with the aerosol generation device, wherein the pulse width modulated power flow comprises one or more pulse width modulation cycles each having an on period and an off period; and controlling the second energy storage module to charge the first energy storage module during the pulse width modulation cycle off period.

15. A non-transitory computer-readable medium storing instructions that when executed by one or more processors of a controller configured for operation with an aerosol generation device power system comprising a first energy storage module and a second energy storage module, cause the one or more processors to control the power system by:

controlling a pulse width modulated power flow of the power system to a heater associated with the aerosol generation device, wherein the pulse width modulated power flow comprises one or more pulse width modulation cycles each having an on period and an off period; and controlling the second energy storage module to charge the first energy storage module during the pulse width modulation cycle off period.

* * * * *